United States Patent [19]
Fougere et al.

[11] Patent Number: 5,998,905
[45] Date of Patent: Dec. 7, 1999

[54] SLOTLESS ELECTRIC MOTOR OR TRANSDUCER AND METHOD FOR MAKING SAME

[75] Inventors: Richard J. Fougere, Blacksburg; Mohammad Khandan-Barani, Radford, both of Va.; Raymond S. Keogh, Farmingdale, N.Y.

[73] Assignees: Kollmorgen Corporation, Waltham, Mass.; Advanced Interconnection Technology, Islip, N.Y.

[21] Appl. No.: 08/845,927

[22] Filed: May 28, 1997

Related U.S. Application Data

[62] Division of application No. 08/471,418, Jun. 6, 1995, abandoned, which is a division of application No. 08/123,428, Sep. 17, 1993, Pat. No. 5,606,791.

[51] Int. Cl.[6] .............................. H02K 1/12; H02K 15/02; H02K 15/04; H02K 15/10
[52] U.S. Cl. ................................ 310/254; 310/42; 310/43
[58] Field of Search ................................ 310/254, 42, 43, 310/179

[56] References Cited

U.S. PATENT DOCUMENTS 3,892,034  7/1975  Arakelov et al. ..................... 29/596
4,679,313  7/1987  Schultz et al. ...................... 29/596

FOREIGN PATENT DOCUMENTS 0160957  12/1980  Japan ............................... 29/855

*Primary Examiner*—Clayton LaBalle
*Attorney, Agent, or Firm*—Morgan & Finnegan, L.L.P.

[57] ABSTRACT

A method of making a slotless electric motor wherein the active winding segments are adhesively affixed to a support surface or previously deposited active wire segments to form a self-supporting winding structure. The self-supporting structure is then secured in a magnetic structure of the slotless stator.

6 Claims, 12 Drawing Sheets

SLOTLESS ELECTRIC MOTOR OR TRANSDUCER AND METHOD FOR MAKING SAME

This is a divisional of application Ser. No. 08/471,418, filed on Jun. 6, 1995, now abandoned, which is a divisional of application Ser. No. 08/123,428 filed Sep. 17, 1993, now U.S. Pat. No. 5,606,791.

This invention relates to slotless electric transducers, such as electric motors, and methods of making the same so that the conductors in the air gap are substantially parallel.

BACKGROUND OF THE INVENTION

In the past most electric motors were constructed according to slotted designs in which the copper conductors of the motor winding were placed between teeth in slots of the laminated iron rotor or stator structure. The slotted designs provide a motor with a relatively small air gap to achieve a desired high permeance. The recent advent of high energy permanent Nd Fe B (neodymium, iron, boron) magnets has made slotless designs feasible in all motors, particularly high performance servo motors. See, for example, U.S. Pat. No. 4,954,739, Servo Motor With High Energy Product Magnets, by Roy D. Schultz et. al. granted to Kollmorgen Corp. In the slotless designs the copper windings are located in the air gap rather than in the slots.

Slotless motor designs have great potential advantages over conventional slotted designs. The slotless designs have a higher potential level of efficiency due to extremely low eddy current losses, extremely low hysteresis losses, the absence of cogging losses and the lack of appreciable iron losses. High speeds in the range of 40k–120k rpm are readily attainable. The operation can be perfectly smooth over a wide speed range since there is no cogging due to the absence of teeth in the slotless design. Furthermore, the lack of magneto-strictive noise from the teeth of a normal design allows for very quiet operation. The slotless design is also capable of a faster motor response (acceleration/deceleration) due to a low inductance.

Various methods have been proposed for making the slotless motors. For example, in the aforementioned U.S. Pat. No. 4,954,739, the winding is formed using a cylindrical support with a reduced diameter portion at one end. A fiberglass sleeve is placed around the uniform diameter portion and thereafter preformed coils are placed in position. When the coils are in place, the thicker end turn portions at one end of the winding are flared inwardly at the reduced diameter portion of the support and the other end of the winding is flared outwardly. The winding can then be inserted into the cylindrical back iron shell starting with the inwardly flared end of the winding. The support can thereafter be withdrawn from the outwardly flared end leaving the fiberglass sleeve as part of the motor structure. The winding is encapsulated using a suitable resin after the winding is inserted into the stator shell.

U.S. Pat. No. 4,130,769 issued Dec. 19, 1978, to Karube describes a layered preformed winding technique for making a slotless, brushless DC motor. A fixture is utilized for preforming flat single layered coils. The preformed coils are placed in the back iron cylinder in a shingle layered fashion with one of the straight coil portions in an outer layer against the back iron and the other straight coil portion in an inner layer. This design appears to be limited to windings with a two conductor thickness.

U.S. Pat. No. 4,445,061 "Methods of Producing Slotless and Toothless Wound Stator" issued to Robert Lender on Jan. 14, 1986, (now assigned to the assignee of this application) describes a method of making and utilizing a fixture which attaches to a cylindrical stator housing, having a smooth al circumference wall. Once the stator is placed in the fixture, temporary fingers are extended radially inwardly. The coils are then wound around the fingers which form temporary slots similar to those in slotted motor designs. The conductors are thereafter forced outwardly against the inner wall of the back iron cylinder by a non-magnetic, expandable, reformable plastic cylinder.

U.S. Pat. No. 4,645,961 "Dynamoelectric Machine Having A Large Magnetic Gap and Flexible Printed Circuit Phase Winding" issued to Herbert Malsky on Feb. 24, 1987, describes the use of a long flexible printed circuit board insulated on both sides. The printed circuit board is rolled in "jelly roll fashion" and placed in the stator back iron cylinder. The winding is closed by soldering in connecting wires at appropriate locations.

In order to fully take advantage of the slotless motor design characteristics the active conductor portion of the winding in the air gap must be straight and parallel to each other and, preferably, to the motor axis of rotation. Any deviation from the parallel alignment decreases the rotatory torque produced by the current flow through the conductor and, hence, reduces the efficiency of the motor. Furthermore, failure to achieve parallel alignment of the conductors results in a larger then necessary air gap and a reduced thermal conductivity for removing heat from winding. As a result of one or more of these factors, the past motor designs and methods of production have not been able to achieve the full potential of the slotless design at a reasonable cost.

SUMMARY OF THE INVENTION

An object of the present invention is to provide a slotless design for a transducer, such as an electric motor, and methods for making the same, in which the active conductor segments of the winding are straight and parallel to each other, and in the preferred embodiment, parallel to the axis of rotation throughout the length of the air gap. In the case of a linear motor the active conductor segments of the winding are preferably parallel to one another and perpendicular to the direction of movement.

Another object of the present invention is to provide a slotless design for a transducer, such as an electric motor, with a high copper packing density to minimize the necessary air gap to accommodate the winding or maximize the number of active conductor segments for a given air gap.

Still another object of the invention is to provide a slotless design for a transducer with good thermal conductivity for efficiently removing heat from the winding.

Yet another object of this invention is to provide an efficient method for manufacture of a transducer or slotless motor.

In accordance with the method of this invention for rotary transducers or motors, insulated copper wire is deposited on a mandrel according to the desired winding configuration. Preferably, a removable sleeve or film wrap surrounds the mandrel and the winding is deposited thereon. While being deposited, the wire is adhered at the desired locations, at least in portions of the active straight air gap segments. The wire may be adhered on an ongoing continuous basis, or an intermittent basis, or may be adhered in sections where the active winding segments are located as a separate step after sections of wire have been deposited. Preferably the wire is adhered through the use of a heat activated adhesive either coated on the wire or placed on the cylindrical surface or both. Adhesive film may also be used by placing the adhesive film on the cylindrical surface or between layers. Heat activation is preferably achieved through the use of ultrasonic energy, but other energy sources can be used. The winding formed on the mandrel is a rigid or semirigid structure that can be removed from the mandrel and positioned in the back iron cylinder of the motor stator.

The method of this invention for linear motors is similar except that the winding structure is normally formed on a flat surface and the wire is deposited by controlling movement of a scribing head in two dimensions on the flat surface. With the linear motor, the active straight air gap segments of the winding are perpendicular to the direction of movement.

Once the formed winding structure is located relative the stator structure it must be rigidly affixed to the back iron. This is preferably achieved using wire coated with a two-stage adhesive or by using a two-stage adhesive film on the support surface or between conductor layers. In the normal state at room temperature the adhesive must be in a non-tacky state so as to not hinder despooling and feeding. While depositing the wire on the mandrel or support surface, the two-stage adhesive is heated sufficiently to tack the wire in place to form the rigid or semi-rigid winding structure. Thereafter, when the preformed winding is in place in the stator structure, the assembly is placed relative to an oven to cure or thermoset the adhesive resin so that the winding is rigidly adhered to the back iron. In some cases a two-stage adhesive may be used with an encapsulent and both cured at the same time. Alternatively, if a two-stage resin is not used in forming the winding, a separate encapsulating resin can be injected and then cured to adhere the winding in place. The resin can be a composition filled with finely divided particles of soft iron or other magnetic material to improve the thermal and magnetic properties of the motor. As another alternative, an adhesive coated wire made of soft magnetic material can be wound around the winding structure to provide the back iron. The soft magnetic wire adhesive can be cured at the same time as the copper winding structure.

The apparatus for forming the a winding according to one embodiment preferably includes a wire scribing head with at least two, and preferably three, degrees of control. The rotary position of the mandrel and the longitudinal position of the scribing head are controlled so that wire can be deposited according to the desired pattern on the cylindrical surface of the mandrel. The third degree of control is desired for multi-layered winding where it is often necessary to control the height of the scribing head above the mandrel surface to accommodate the previously deposited layers. The three degrees of control are preferably achieved through a software computer program designed for the desired winding configuration and motor size. Similar apparatus can be used to form a winding for a linear motor where the scribing head is controlled to deposit the wire on a flat surface.

An alternate apparatus for forming the winding aligns the adhesive coated, insulated wire under tension so that the wire is parallel to the axis of rotation for the length of the air gap. Energy, preferably ultrasonic, is applied to the straight wire segment or portions thereof to activate the adhesive. The straight conductor segment is pressed into contact with the mandrel surface or previously deposited segments. When the energy is removed, the wire segment forms part of the rigid or semirigid winding structure being formed.

GENERAL DESCRIPTION OF THE DRAWINGS

The foregoing and other objects of the invention will become obvious from the following detailed specification which incorporates the drawings and wherein.

DETAILED DESCRIPTION OF THE INVENTION

Figure 1:
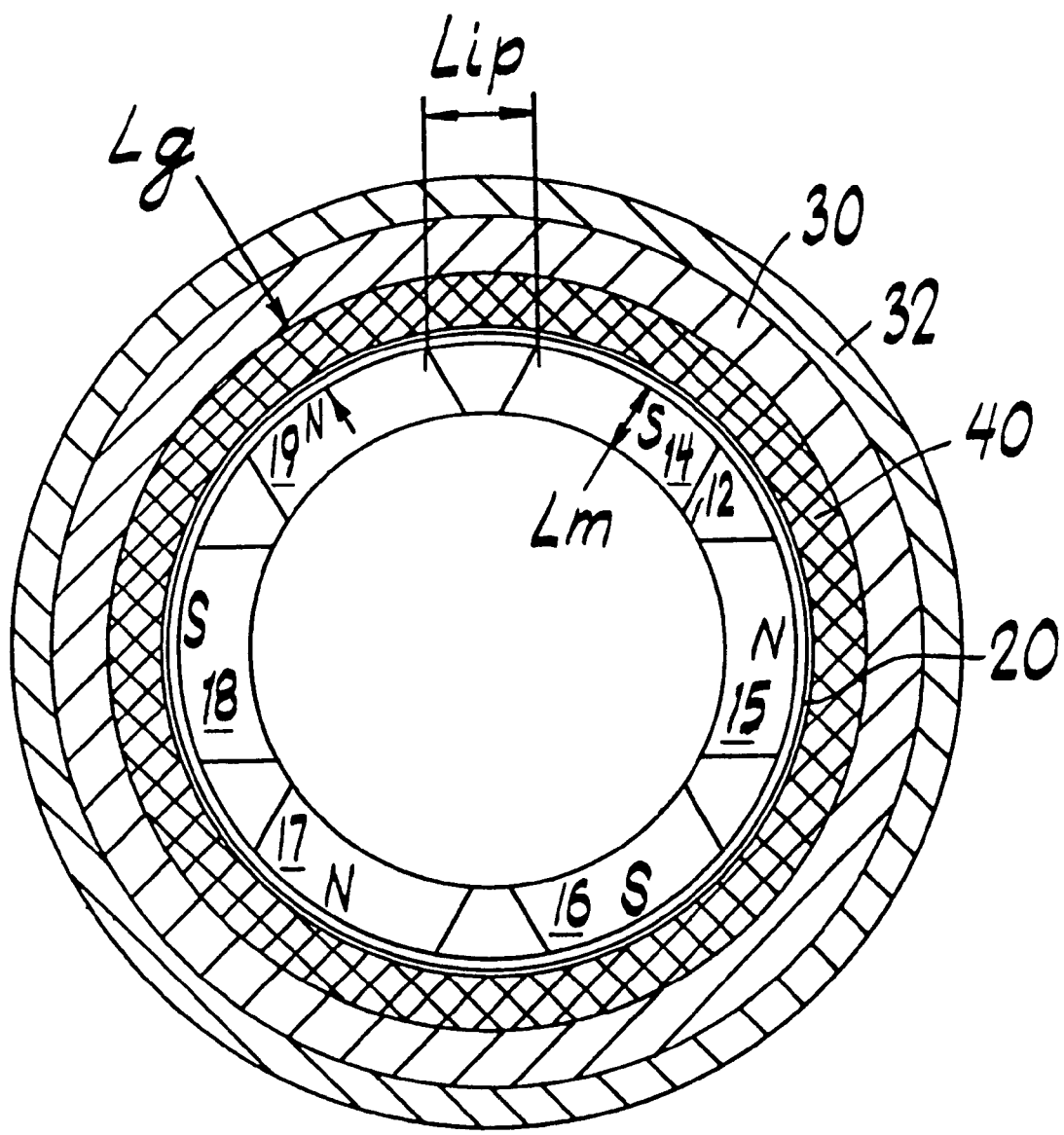
FIG. 1 is a cross-sectional end view of the motor according to the invention.
Figure 2A:
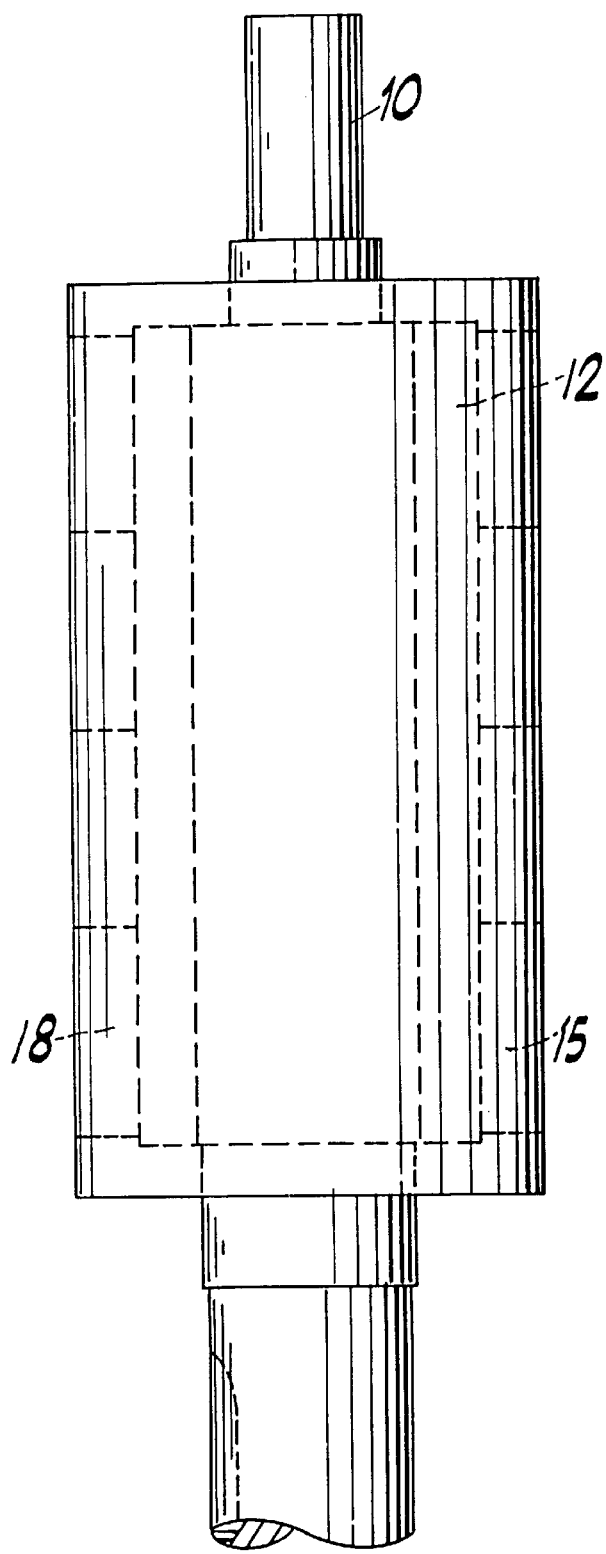
FIGS. 2A and 2B are a side view and end view respectively, of the rotor portion of the motor.
Figure 2B:
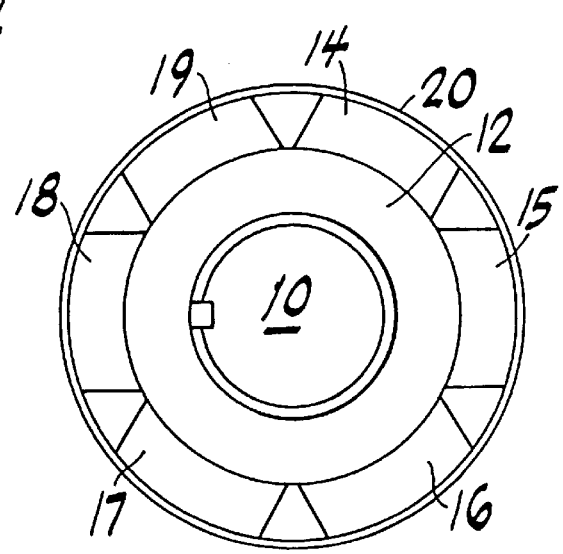
Figure 3:
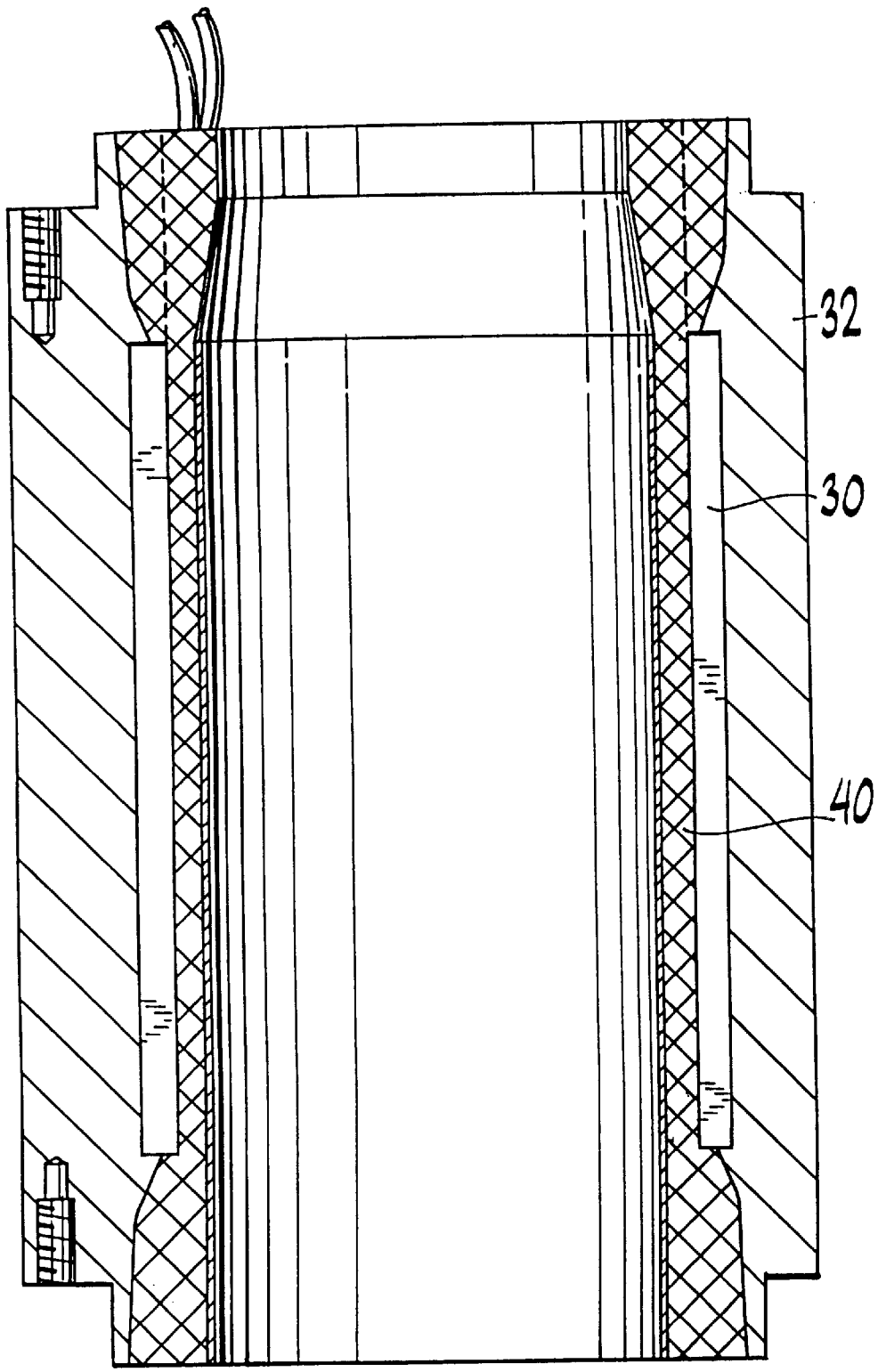
FIG. 3 is a cross-sectional view of the stator of the motor.

The general structure of the motor made by the method and apparatus according to the invention is shown in FIGS. 1–3.

The motor includes a steel shaft 10 surrounded by a cylindrical back iron sleeve 12. Six permanent magnets 14–19 are mounted on sleeve 12 extending radially and are magnetized to provide alternating north and south poles as shown in FIG. 1. In the preferred embodiment, the magnets are high energy product magnets with energy products in excess of 26 MGOe (MegaGauss Oersteds) and preferably in excess of 30 MGOe. Suitable permanent magnets are, for example, those made from neodymium, iron and boron such as are available from Sumitomo Special Materials Co. Ltd. of Japan under the trade name NEOMAX-30H. The magnets are pressed, arcuate shaped magnets and are mounted on the back iron sleeve surrounding shaft 10. Alternatively one or more ring magnets could be used instead of the separate arcuate shaped magnets.

A banding 20 surrounds the rotor structure to hold the magnets in place under high speed centrifugal force conditions. Banding is accomplished using high strength Kevlar filaments which are dipped in epoxy and then wound around the rotor including one or more helical layers followed by several hoop layers.

The rotor can be constructed using six magnets each extending the full length of the rotor, or the magnets can be segmented as shown in FIG. 2A. An advantage to the segmented magnets is that a single motor design can produce motors of different horsepower ratings by simply changing the motor length and the number of magnet segments.

The stator structure includes a cylindrical outer shell 30 of laminated silicon steel which provides the outer back iron for the motor. The laminations are assembled and then cast in an aluminum outer housing 32. The winding structure 40 is formed including straight active segments parallel to the axis of rotation and end turn segments. The winding structure, once formed, is then mounted inside the cylindrical back iron shell. The stator structure is slotless and, hence, the windings are located in the motor air gap between the permanent magnets of the rotor and the cylindrical inner surface of the stator shell. Since there are no teeth in the stator, the entire inner cylindrical surface can be used by the copper of the windings. If desired, small notches can be randomly located in the internal circumference of the laminations for better bonding to the winding against torque forces produced in the motor.

Figure 4:
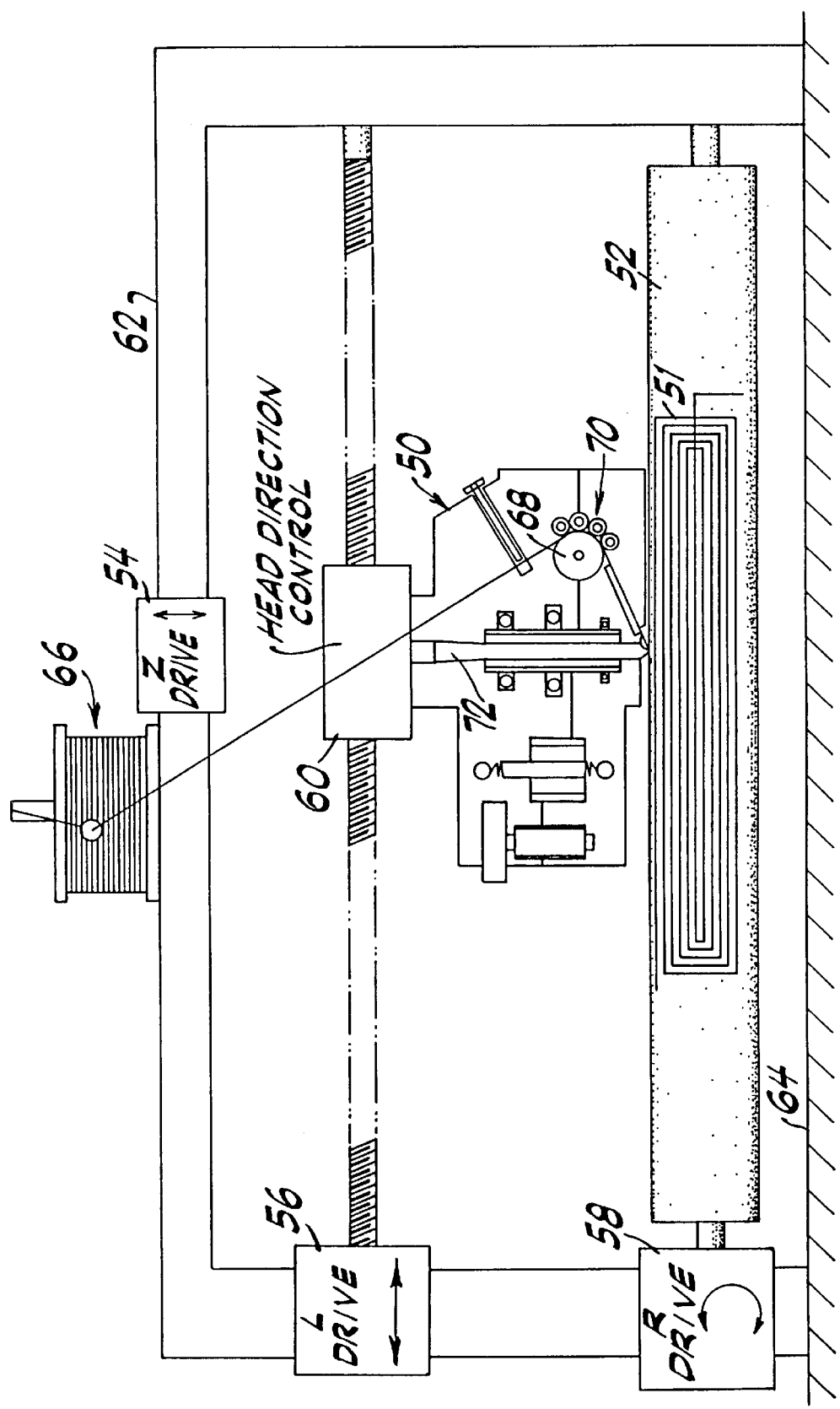
FIG. 4 is a schematic illustration showing the wire scribed head and associated apparatus for making a self supporting winding structure according to the invention.

Apparatus according to one embodiment for creating the winding on a mandrel for subsequent insertion into the motor is illustrated in FIG. 4. The movement of a wire scribing head 50 is controlled relative to the surface of a mandrel 52 to dispense insulated, adhesive coated wire according to the desired winding pattern 51. The rotary position of the mandrel is controlled by an R drive 58. The longitudinal position of the wire scribing head relative to the mandrel is controlled by an L drive 56. The height of the wire scribing head relative to the surface of the mandrel according to the number of previously deposited winding layers is controlled by a Z drive 54. Drives 54 and 56 can be of the stepping motor driven lead screw type, as shown, or can be of the linear positioning type. A head direction control 60 controls the rotary position of the wire scribing head about the vertical axis so that the wire is dispensed in a direction according to the direction of movement relative to the mandrel surface. Drives 54, 56 and 58 are mounted on a frame 62 which in turn is mounted on a high mass base such as a large block of granite.

The mandrel is preferably wrapped with Kapton film coated on its outer side with an adhesive coating similar to that coated on the wire. The Kapton wrap may be used to facilitate removal of the winding.

The insulated wire used to form the winding is dispensed from a spool 66 mounted above frame 62. As will be explained hereinafter in more detail, the insulated wire is coated with an adhesive composition, preferably a two-stage adhesive which at moderate temperatures can tack the wire and subsequently quickly revert to a non-tacky state and at elevated temperatures is cured to its thermoset condition to form a rigid winding solidly secured to the stator structure. In the preferred embodiment, the winding structure is inserted into the stator shell, provided with an encapsulant and exposed to a temperature sufficient to cure the encapsulant and the adhesive wire coating.

The wire from the spool passes around a drive roller 68 which feeds the wire at the correct speed according the movement of the scribing head relative to the mandrel. Four idler rollers 70 press against the feed roller to maintain a friction grip on the wire. An ultrasonic stylus 72 straddles the wire at the point of contact with the mandrel surface. The stylus provides sufficient energy to heat the wire coating to the tacky state sufficient to adhere the wire to the mandrel surface. A suitable wire scribing head structure is described in greater detail in U.S. Pat. No. 4,641,773, Ultrasonic Stylus Position Stabilizer issued to Morino et al. A suitable adhesive coated insulated wire is available from Essex Corp. under the trade name "Bond M Wire".

A suitable two-stage adhesive for coating wire for use with this invention is described in U.S. Pat. No. 4,642,321 "Heat Activatable Adhesive For Wire Scribed Circuits" to Schoenberg et. al. The adhesive composition includes (a) a polymeric resin such as a polyester resin, a polyurethane resin or an epoxy resin, (b) a filler and (c) a curing agent which is capable of forming crosslinks to cure the polymer resin but which is non-reactive blocked at the conditions that activate the adhesive composition. It is important that the adhesive composition be non-tacky at room temperature so that the coated wire can readily be unreeled from the spool and passed through the wire scribing head. The adhesive is activated by ultrasonic energy from the stylus as the wire is deposited and rapidly returns to the hardened state as the adhesive cools. The adhesive composition is also thermosetting so that it can be cured by heating to elevated temperatures well above the temperatures that activate the adhesive.

The winding can follow virtually any desired pattern. FIG. 4 shows the first coil 51 of a winding suitable for a six pole motor. The coil is in the form of a longitudinal spiral beginning at the center and extending until it covers about one third of the mandrel surface. Two similar additional coils can be formed so that a single layer winding covers the surface of the mandrel. Additional layers of the winding can then be formed on top of prior layers. Of particular importance is that the active conductor portions which will lie in the air gap of the completed motor between the end turn segments are formed straight and parallel to the axis of rotation. Such parallel conductors provide the most efficient energy to torque conversion, permit a high copper packing density, and provide improved thermal dissipation by minimizing the potting material required to secure the winding. Using the method and apparatus of the invention permits formation of a winding with straight, parallel conductors in a substantially rigid self-supporting form prior to insertion into the stator structure and prior to curing of the resin.

The winding apparatus in FIG. 4 is preferably software controlled through a suitable computer. The computer is interfaced to control the rotary position of the mandrel through R drive 58, to control the longitudinal position of the scribing head relative to the mandrel through L drive 56, to control the height of the scribing head above the mandrel surface according to previously deposited wire layers via Z drive 54, to control the head direction through control 60 and to control drive roller 68 to dispense wire at the appropriate rate. Through the software control, the system can be completely flexible since different types or sizes of windings can easily be made in any desired production run by simply changing the software and possibly the mandrel size.

Figure 5A:
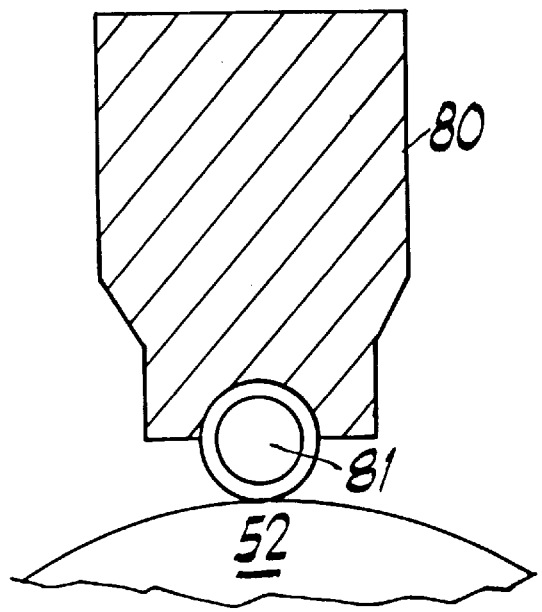
FIG. 5A is a cross sectional diagram showing the wire scribing stylus for a single conductor and FIG. 5B is a cross sectional drawing illustrating modifications of the ultrasonic stylus for three conductors.
Figure 5B:
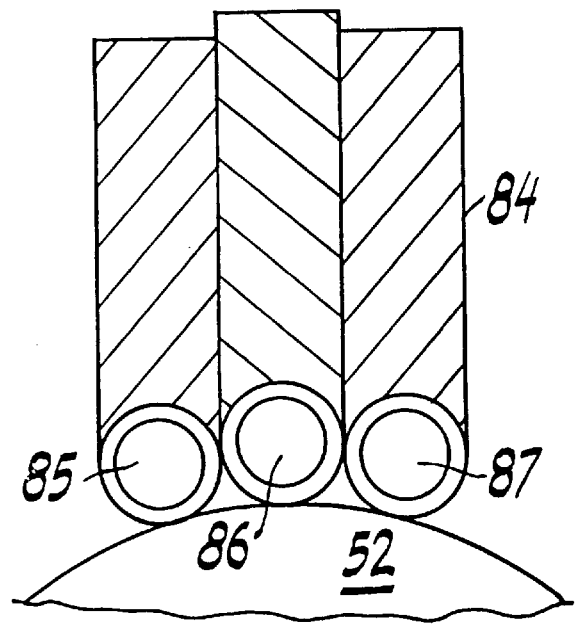

FIGS. 5A and 5B are cross-sectional views showing alternate embodiments for the ultrasonic stylus of the scribing head. FIG. 5A illustrates a stylus tip for a single conductor 81. The stylus tip partially surrounds the conductor and imparts ultrasonic energy to activate the adhesive surrounding the conductor to adhere the conductor. In the alternative embodiment illustrated in FIG. 5B the ultrasonic stylus 84 is configured to partially surround three conductors 85–87 being deposited at the same time.

Figure 6:
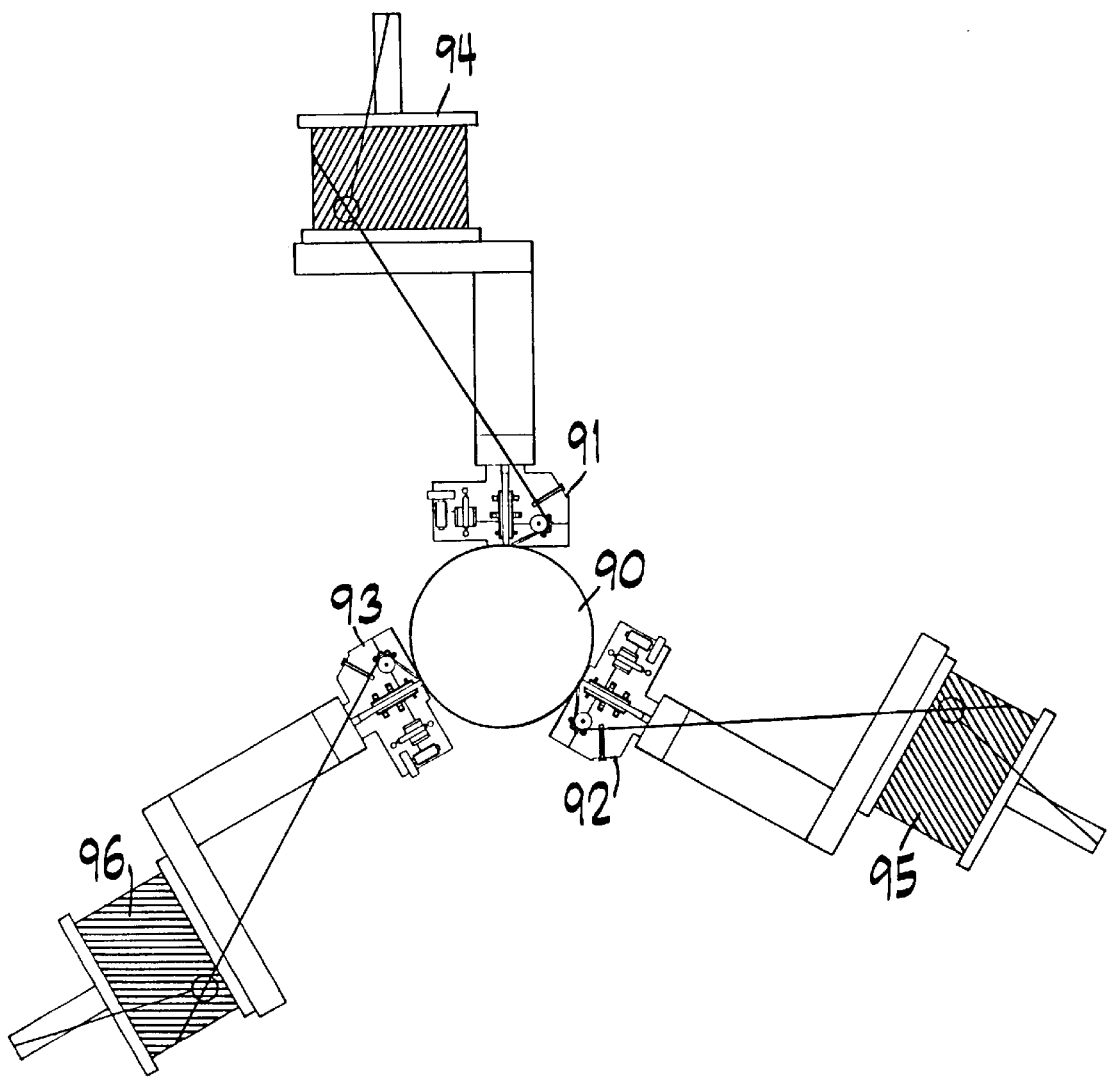
FIG. 6 is a schematic illustration of the apparatus employing three scrolling heads to create a three phase winding structure.

FIG. 6 illustrates an alternate embodiment for creating a three-phase winding using three scribing heads active It at the same time. The scribing heads 91–93 are displaced by 120 degrees from one another about the mandrel 90. The scribing heads 91–93 receive wire from separate spools 94–96, respectively. With this arrangement three coils of a three-phase winding are formed simultaneously.

Figure 7:
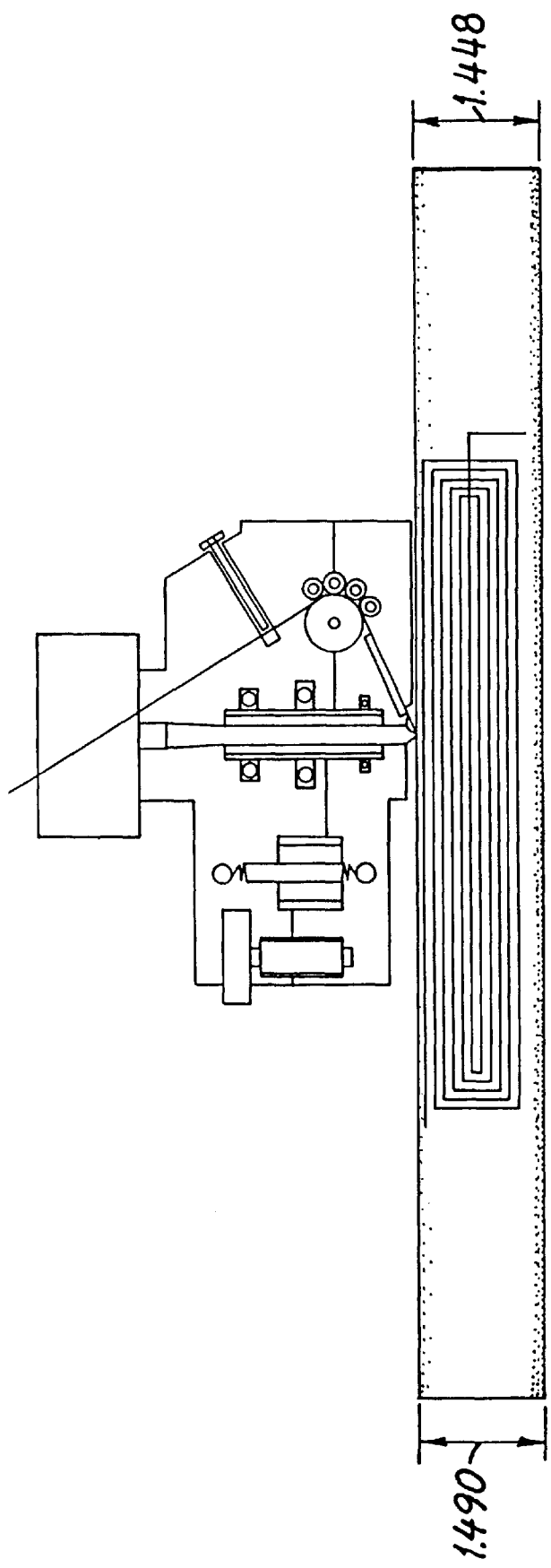
FIG. 7 is an illustration of a tapered mandrel for use with the apparatus illustrated in FIG. 4.

FIG. 7 illustrates a winding apparatus with a tapered mandrel. As shown in the illustration, the mandrel, dimensioned for a particular motor, has a diameter of 1.490 inches at one end and a diameter of 1.448 inches at the other end. The taper in the mandrel facilitates removal of the winding structure after formation.

Figure 8:
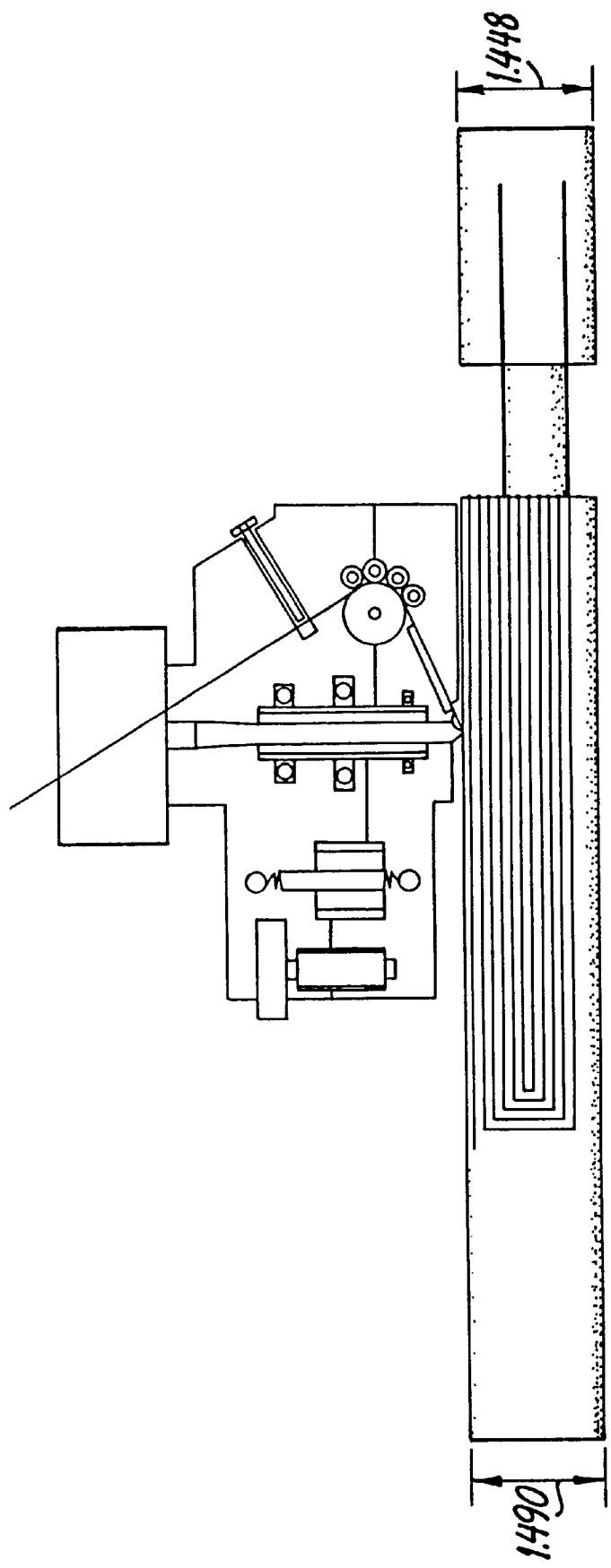
FIG. 8 is an illustration of a tapered "drug cup" mandrel for use with the apparatus shown in FIG. 4.

FIG. 8 illustrates a tapered mandrel for forming a "drug-cup" winding structure. This mandrel is tapered as is the case with the mandrel in FIG. 7 to facilitate removal of the winding structure. The smaller end of the mandrel has a reduced diameter section to accommodate end turns forming the bottom of the "cup".

Figure 9:
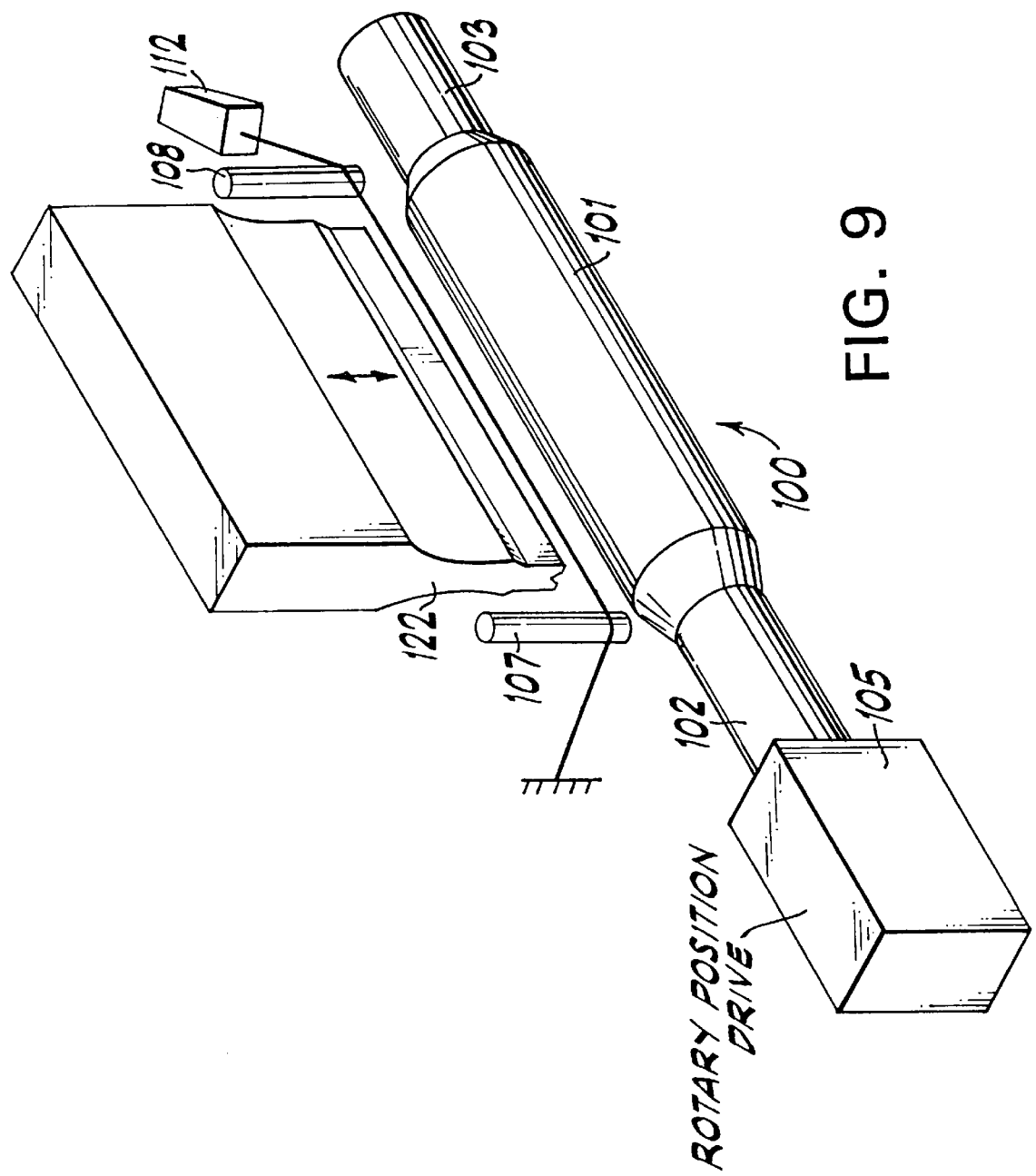
FIG. 9 is a perspective illustration of an alternate apparatus for creating a winding structure wherein an entire active winding segment can be adhered at the same time.
Figure 10:
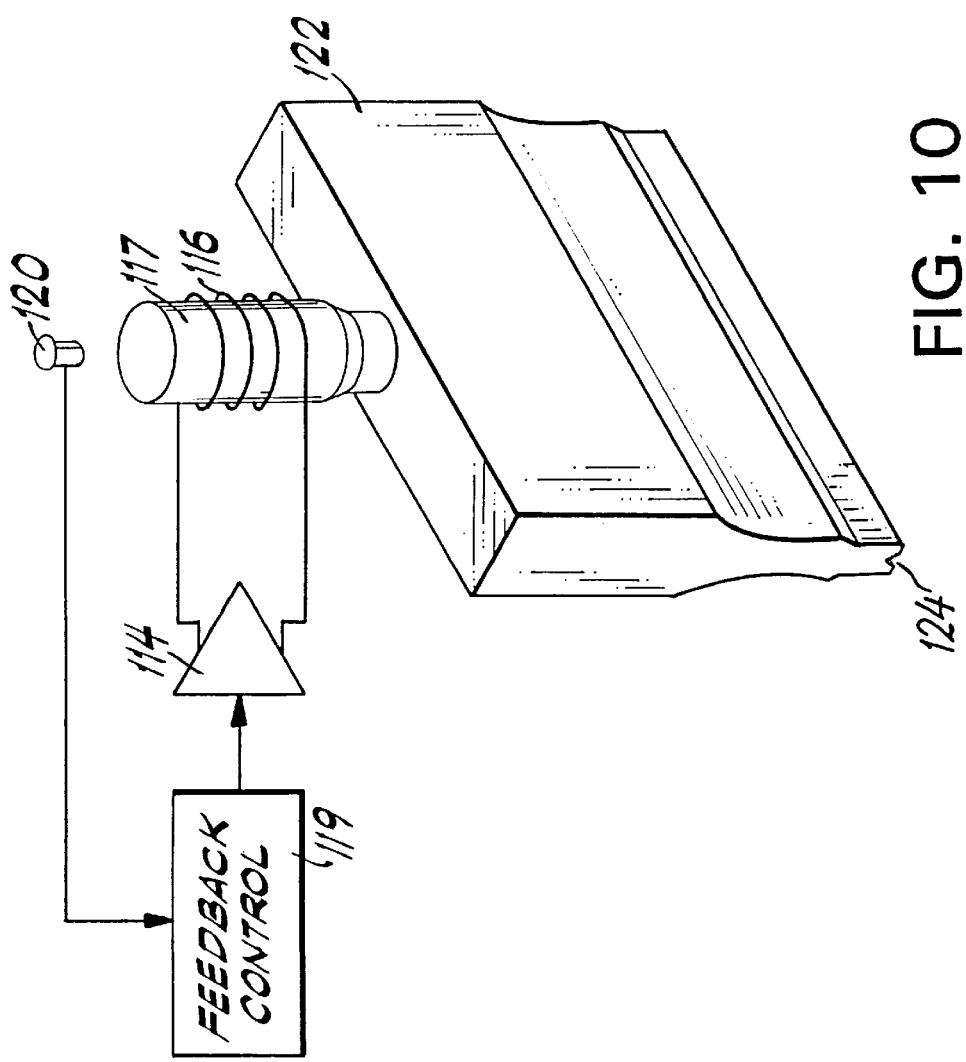
FIG. 10 is a partially perspective and partially schematic illustration of an ultrasonic transducer and associated equipment for use in the apparatus of FIG. 9.
Figure 11:
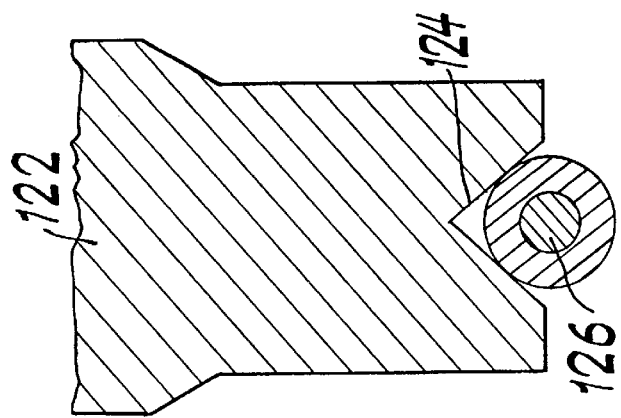
FIG. 11 is a cross-sectional view of the ultrasonic horn shown when capturing an insulated conductor.

Alternate apparatus for making a self supporting winding structure according to the invention is illustrated in FIGS. 9–11. In this embodiment the adhesive coated, insulated wire is adhered a section at a time rather than on a continuous ongoing basis. The wire is aligned parallel to the axis of rotation, placed under tension and then pressed into the underlying surface while energy is applied to activate the adhesive. Thus, an entire active segment, or a portion thereof, is adhered at the same time.

The mandrel 100 includes an increased diameter portion 101 which corresponds in diameter to the diameter of the rotor in, the motor being built. The length of the increased diameter portion corresponds to the active winding portion in the air gap of the motor. The end portions of the mandrel 102 and 103 have a reduced diameter to accommodate the winding end turns. A rotary position drive 105 is used to position the mandrel at an accuracy within arc minutes.

The increased diameter portion of the mandrel is wrapped with a Mylar film to facilitate easy removal of the winding structure after formation. The film is coated with a suitable thermoplastic material such as Kapton available from DuPont.

A pair of guide pins 107 and 108 is used to position the insulated wire 110 being dispensed from a suitable wire dispensing bobbin 112. As illustrated in FIG. 9, one end of the wire is secured so that the other end at bobbin 112 can place the straight wire section 110 under tension parallel to the axis of the rotation.

Ultrasonic energy is provided to activate the adhesive on the mandrel surface or on the coated conductors. As shown in FIG. 10, an amplifier 114 is connected to a driving coil 116 surrounding an ultrasonic transducer 117. A microphone 120 picks up the vibration frequency of the transducer and is used to provide a feedback signal which maintains oscillation at the resonant frequency of the transducer. The microphone is coupled to a feedback control circuit 119 which determines both the frequency and amplitude of the drive signal supplied to the driving coil by amplifier 114.

Transducer 117 is coupled to a horn 122 which is shaped to provide a V-shaped groove parallel to the axis of rotation. The groove is dimensioned as shown in FIG. 11 such that between one-quarter and one-half the diameter of the insulated conductor 126 lies above the plane passing through the lower horizontal surface of the horn.

In the raised position, as shown in FIG. 9, the v-shaped groove is located about 0.25" above the surface below. When the ultrasonic horn moves downwardly, the wire 110 is captured in the v-shaped groove and urged downwardly toward the mandrel surface. The amount of ultrasonic energy supplied is determined empirically and is sufficient to heat the adhesive to the active state. The downward force is controlled to bring the wire into contact with the mandrel surface or the previously-deposited wire such that the ultrasonic energy activates the contact surfaces. The downward force of the horn should not be sufficient to move any previously deposited conductors or disturb the layer integrity. The ultrasonic energy is removed about one-third of a second before raising the horn so that the adhesive can set before the v-shaped groove rises.

After a straight wire section is adhered, guide pins 107 and 108 are temporarily removed. The mandrel is rotated as wire is dispensed to form an end turn. The guide pins are then reset, and the bobbin continues to dispense wire for the next active conductor run. Alternatively, this straight run section is placed under tension and then adhered by applying ultrasonic energy and pressing the conductor into the contact surface below. The winding structure is formed by continuing in this fashion alternately forming straight conductor runs and end turns. At least the straight active conductor runs, or portions thereof, are adhered before going on to the next end turn or active conductor run.

Figure 12:
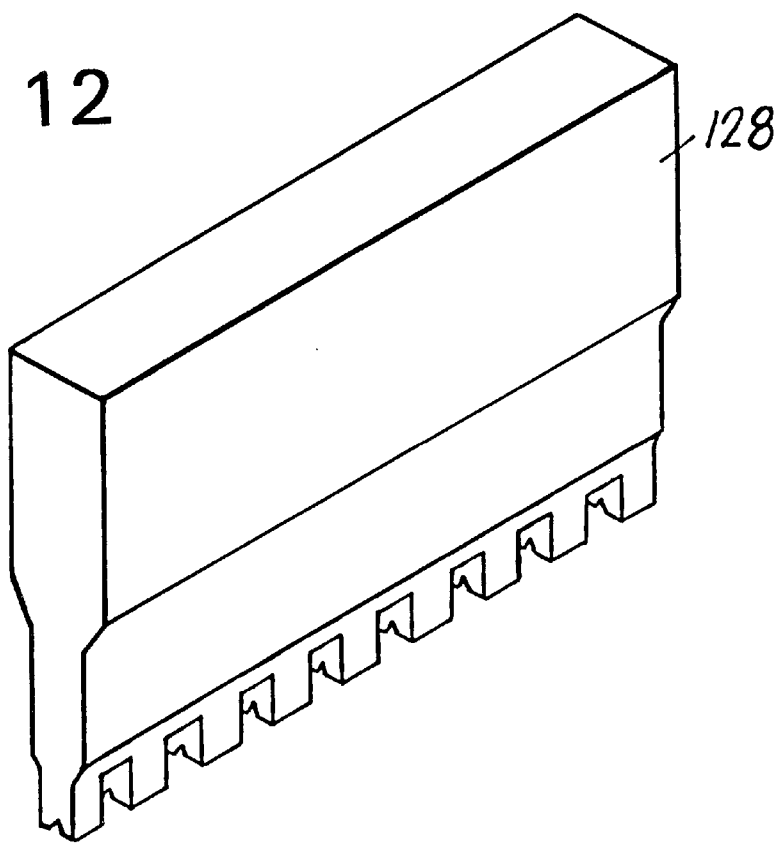
FIG. 12 is a perspective view of an alternative embodiment wherein the ultrasonic horn is designed for a stitch type adherence of the insulated wire.
Figure 13:
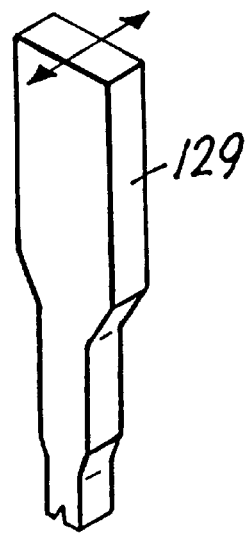
FIG. 13 is a perspective view of another alternative embodiment wherein the ultrasonic horn is narrow and movable relative to the mandrel to similarly achieve a stitch type adhesive.

The ultrasonic horn 122 in FIG. 9 adheres the entire straight, active conductor run in a single operation. FIG. 12 illustrates an alternative structure where the horn 128 is intended to intermittently contact the active conductor run to achieve a stitch type adherence in a single operation. FIG. 13 illustrates another alternative where a narrow ultrasonic horn 129 is movable relative to the longitudinal axis of the mandrel is used to achieve a similar intermittent adherence of the insulated wire. In this case the horn is moved longitudinally to a desired adherence point and then downwardly to activate the adhesive. Normally the active conductor run would be adhered at the ends and at several points there between.

A preferred technique for forming a multi-phase winding, such as a three-phase winding, uses multiple spools of insulated wire. The system first forms the first layer of the first coil of the first phase on the mandrel surface. Next the first layer of the second coil in the second phase is formed using a different spool of wire. Then, using a third spool of wire, the first layer of the third coil in the third phase is formed. When the first layers of each of the phases have been formed on the mandrel surface, the system again uses the first spool to form the second layer of the first coil in the first phase. The second and third spools are subsequently used to form the second layer in the second and third phases. The winding proceeds in thi fashion until the three-phase, multi-layer winding is completed.

The system is computer controlled so that virtually any desired type winding can be produced. The computer controls not only the rotary position of the mandrel, but also the guide pin positioning and the operating conditions for the ultrasonic horn and its movement. The system is capable of forming windings with as little as a two conductor pole span.

Alternative apparatus for making a three phase winding could include three complete winding stations displaced from one another by 120°.

Figure 14:
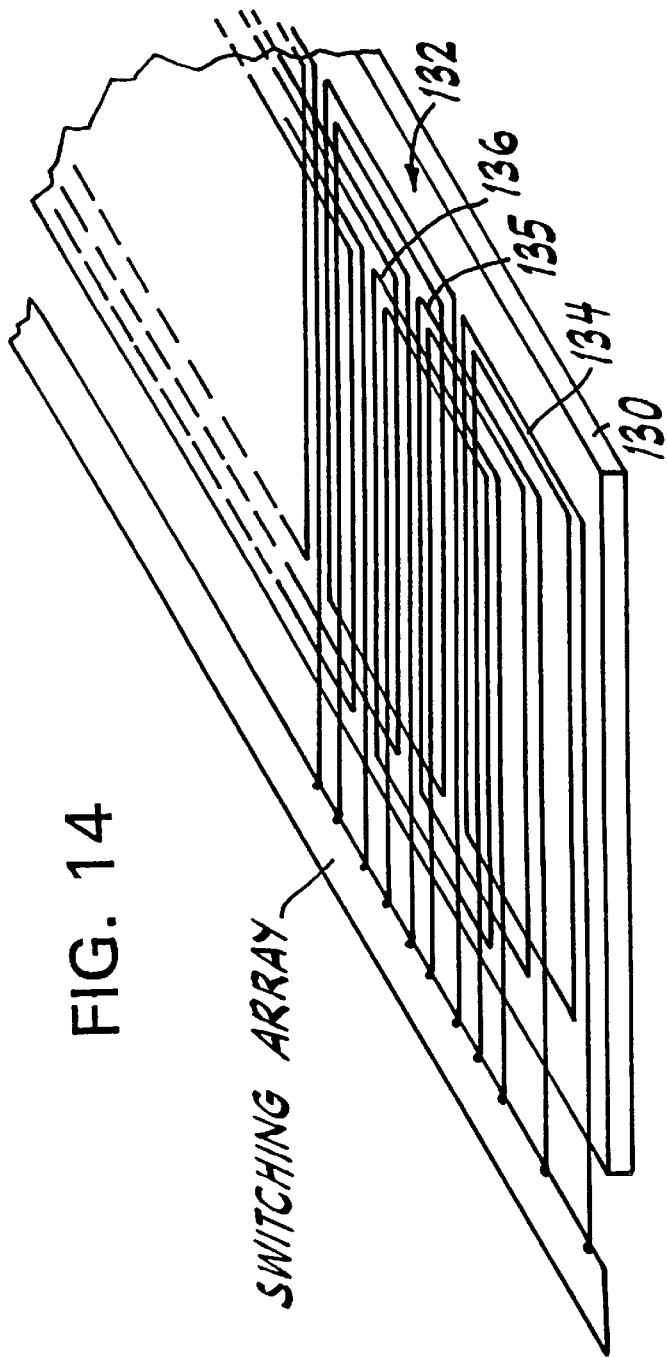
FIG. 14 is a perspective schematic view of the stator of a linear motor made according to the inventor.

FIG. 14 illustrates the stator of a linear motor which can be made using the invention. The stator winding structure can be formed on a suitable flat forming surface 130 or, preferably, on the surface that provides the back iron for the stator. If a setlf-supportive stator winding is first formed and then transferred to the back iron stator structure, the forming surface is preferably coated with a material like Teflon or covered with a ilm material like Kapton.

The winding structure 132 can be of any suitable configuration for the desired linear motor and is preferably formed using adhesive coated insulated wire. The winding illustrated in FIG. 14 is a single layered winding where the coils 134–136 are deposited in a shingle fashion. Although shown as a single layer winding for ease of illustration, the practical winding would normally be multi layered. The wire can be deposited and ashered to the forming surface or previously deposited wire lasing a scribing head similar to that shown in FIG. 4. The scribing head is designed for controlled movement in the x and y coordinates. In addition to the adhesive coating on the wire, or as an alternative thereto, an adhesive layer can be placed on the forming surface or between conductor layers. The active conductor portions of the winding are perpendicular to the direction of movement and are parallel to one another.

After the stator winding is formed, it is rigidly adhered to the stator back iron 130. This can be accomplished by curing a two-stage adhesive or by using or adding a thermosetting encapsulant.

Figure 15:
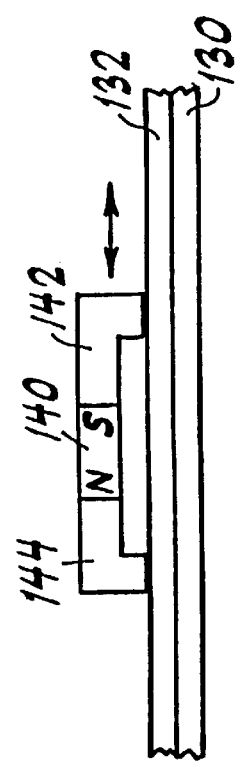
FIG. 15 is an illustration showing the moving permanent magnet in combination of the stator winding of the linear motor.

As illustrated in FIG. 15, the linear motor includes a moving permanent magnet 140 mounted on a carriage (not shown) for linear movement relative to the stator winding 132. Soft iron pole pieces 142 and 144 are dimensioned so that the distance between the pole faces corresponds to the coil span of the statort winding. The beck iron 130 completes the magnetic path for the moving magnet. The coils 134–136 are connected to a suitable switching array designed to energize the coils in succession to achieve the desired linear motion.

The method for forming a motor winding structure according to preferred embodiments of the invention includes the following steps:

a. Depositing insulated wire on a mandrel or cylindrical support according to a desired winding pattern. Either the support surface, the insulated wire, or both, are covered with a heat activatable adhesive. Further adhesive may be added between conductor layers. The coils of the winding pattern include active segments to be located in the air gap and end turn segments between successive active segments. The active segments are preferably straight and parallel to the axis.

b. Energy preferably ultrasonic, is applied while at least part of the insulated wire is being deposited so that the active segments re adhered parallel to the axis of rotation. Alternate energy sources include infrared and laser energy. The winding structure with the adhered portions is semi-rigid and self-supporting.

c. The self-supporting winding structure is removed from the mandrel and placed inside the back iron cylinder of the stator of the motor. The winding is then encapsulated to rigidly, secure the winding to the back iron cylinder. Although a separate encapsulating resin can be used, preferably the heat activatable adhesive also includes a thermosetting resin which can be cured to perform the encapsulating function. A preferred alternative is to use an encapsulant in addition to a heat activatable adhesive including a thermosetting resin.

d. Once he winding structure is in place, the motor assembly can be completed preferably including rotating high energy permanent magnets.

e. In the case of a linear motor the insulated wire is deposited on a flat forming surface which can be the back iron of the stator. The active segments of the winding are preferably parallel and per pendicular to the direction of movement. The winding structure after formation is incapulated to rigidly secure the winding to the back irons.

f. The adhesive can be activated on an ongoing, continuous basis as wire is dispensed or can be activated one segment at a time. The insulated wire can be adhered by activating the adhesive only for active segments of the winding or portions thereof. The insulated wire can also be adhered in an intermittent stitched fashion.

g. To facilitate removal of the self-supporting winding structure the mandrel or forming surface can be wrapped with a film material such as Mylar or coated with a material like Teflon.

h. To facilitate insertion of the self-supporting winding structure into the back iron cylinder (or stator shell), the end turn segments at one end can be displaced inwardly so that the diameter of the end turn segment portion of the winding structures does not exceed the diameter of the active segment portion. The winding structure can then be inserted with the inwardly displaced end turns first. The inward displacement of the end turns can also be achieved by applying heat and pressure sufficient to reactivate the adhesive and inwardly displace the end turns after completion of the winding structure and before insertion into the stator shell.

i. When the semi-rigid winding structure is laced in the back iron shell, the winding can be outwardly compressed against the shell to increase the conductor packing density and reduce the void space otherwise filled with encapsulant. The outward compression can be achieved using an inflatable balloon, an expandable split roller, a drawing operation, or other known techniques. Heat can also be applied so that the compression and heat temporarily convert the adhesive to the plastic state. Alternately, the compression step can be carried out while the winding structure is inserted in a fixture prior to being placed in the back iron shell.

j. The adhesive and/or encapsulant can comprise a resin composition in which the filler normally present in the composition is replaced by powdered particles of magnetically soft material such as iron or Metglass. Preferably the particles are precoated with an electrically insulating layer. The particles are used to improve the magnetic and thermal properties of the motor. The filler can also be replaced by ceramic particles, industrial diamond chips or other materials with high thermal conductivity.

k. As an alternative to using a back iron cylindrical shell, the winding structure can be wrapped with adhesive coated soft iron wire. Normally five or six layers of iron wire are sufficient. The wire wrap provides the back iron with minimum spacing between the winding and the back iron to minimize the encapsulant and consequent thermal barrier. A further advantage of using a wrapped iron wire shell is that it facilitates complex multi-winding structures including winding used for rotor position sensing or for field weakening motor control.

l. Instead of a mandrel the actual rotor of the motor could be used. The rotor is wrapped with one or more layers of at film material like Mylar to provide a working space between the rotor and stator. In a preferred embodiment, care is taken to provide a uniform surface for formation of the winding. The winding structure is formed on the Mylar as is the case when using a mandrel.

While only a limited number of embodiments illustrating the present invention have been shown, it is obvious that numerous modifications could be made without departing from the scope of this invention. The scope of this invention is more particularly defined in the appended claims.

What is claimed is:

1. An electro-mechanical transducer comprising a slotless stator including a preformed, at least partially rigid, self-supporting, winding structure having active segments and end-turn segments and which is made by the steps of:

depositing insulated wire on a support surface;

adhesively affixing at least active wire segments portions of said insulated wire to said support surface or to previously deposited wires, with at least active wire segments of said winding structure attached in predetermined, substantially fixed positions with respect to other active segments of said winding structure;

encapsulating and securely attaching said winding structure to the metal structure of the slotless stator; and combining said stator with permanent magnets movable relative to said stator.

2. An electric motor comprising a slotless stator including a preformed, at least partially rigid, self-supporting, winding structure having active segments and end-turn segments and which is made by the steps of:

depositing insulated wire on a support surface;

adhesively affixing at least active wire segments portions of said insulated wire to said support surface or to previously deposited wires, with at least active wire segments of said winding structure attached in predetermined, substantially fixed positions with respect to other active segments of said winding structure;

encapsulating and securely attaching said winding structure to the metal structure of said slotless stator; and combining said slotless stator with one or more rotating permanent magnets movable relative to said slotless stator.

3. An electric motor comprising a slotless stator including a preformed, at least partially rigid, self-supporting, winding structure having active segments and end-turn segments and which is made by the steps of:

depositing insulated wire on a support surface;

adhesively affixing at least active wire segments portions of said insulated wire to said support surface or to previously deposited wires, with at least active wire segments of said winding structure attached in predetermined, substantially fixed positions with respect to other active segments of said said winding structure;

encapsulating and securely attaching said winding structure to the metal structure of said slotless stator; and combining said slotless stator with one or more permanent magnets movable linearly relative to said slotless stator.

4. A winding structure which is preformed and at least partially rigid for a rotating electro-mechanical transducer which includes a slotless stator having a shell and said winding structure disposed inside the stator shell and a rotor provided with one or more permanent magnets and which winding structure is made by the steps of:

(1) depositing insulated wire on a cylindrical support surface, either said insulated wire or said cylindrical support surface, or both being coated or provided with an adhesive layer that can be activated by application of energy;

(a) part of said insulated wire being dispensed parallel to the axis of said cylindrical support while traveling toward one end of said cylindrical support surface to form an active conductor segment of said winding structure;

(b) part of said insulated wire being dispensed to form a wire constituting an end-turn;

(c) part of said insulated wire being thereafter dispensed while traveling in the reverse direction parallel to said axis of said cylindrical support surface to form another active conductor segment of said winding structure;

(d) part of said insulated wire being next dispensed to form another wire loop constituting an end-turn;

(e) repeating steps (a) to (d) until all winding coils of said winding structure are completed;

(2) adhesively attaching at least portions of each active conductor segment before forming the next segment constituting an active part of said winding structure; thereby forming a cylindrical winding structure with at least the active conductor portions being adhered;

(3) encapsulating said winding structure and simultaneously adhesively bonding it to the stator shell, using as the encapsulant a resinous composition; and (4) completing the assembly of the electro-mechanical transducer to include at least one rotating permanent magnet within said winding structure.

5. A slotless stator with a preformed, at least partially rigid, winding structure with a stator shell and a rotor provided with one or more permanent magnets made by the steps of:

(1) depositing insulated wire on a cylindrical support surface, either said insulated wire or said cylindrical support surface, or both being coated or provided with an adhesive layer that can be activated by application of energy;

(a) part of said insulated wire being dispensed parallel to the axis of said cylindrical support surface while traveling toward one end of said cylindrical support surface to form an active conductor segment of said winding structure;

(b) part of said insulated wire being dispensed to form a wire constituting an end-turn;

(c) part of said insulated wire being thereafter dispensed while traveling in the reverse direction parallel to said axis of said cylindrical support surface to form another active conductor segment of said winding structure;

(d) part of said insulated wire being next dispensed to form another wire loop constituting an end-turn;

(e) repeating steps (a) to (d) until all winding coils of said winding structure are completed;

(2) adhesively attaching at least portions of each active conductor segment before forming the next segment constituting an active part of said winding structure; thereby forming a cylindrical winding structure with at least the active conductor portions being adhered;

(3) encapsulating said winding structure and simultaneously adhesively bonding it to the stator shell, using as the encapsulant a resinous composition; and (4) completing the assembly of the electro-mechanical transducer to include at least one rotating permanent magnet within said winding structure.

6. An electro-mechanical transducer which is rotatable and includes a slotless stator having a shell and a preformed, at least partially ridig, winding structure disposed inside the stator shell and a rotor provided with one or more permanent magnets made by the steps of:

(1) depositing insulated wire on a cylindrical support surface, either said insulated wire or said cylindrical support surface, or both being coated or provided with an adhesive layer that can be activated by application of energy;

(a) part of said wire being dispensed parallel to the axis of said cylindrical support while traveling toward one end of said cylindrical support surface to form an active conductor segment of said winding structure;

(b) part of said insulated wire being dispensed to form a wire constituting an end-turn;

(c) part of said insulated wire being thereafter dispensed while traveling in the reverse direction parallel to said axis of said cylindrical support surface to form another active conductor segment of said winding structure;

(d) part of said insulated wire being next dispensed to form another wire loop constituting an end-turn;

(e) repeating steps (a) to (d) until all winding coils of said winding structure are completed;

(2) adhesively attaching at least portions of each active conductor segment before forming the next segment constituting an active part of said winding structure; thereby forming a cylindrical winding structure with at least the active conductor portions being adhered;

(3) encapsulating said winding structure and simultaneously adhesively bonding it to the stator shell, using as the encapsulant a resinous composition; and (4) completing the assembly of the electro-mechanical transducer to include at least one rotating permanent magnet within said winding structure.

\* \* \* \* \*